June 6, 1933.   W. F. LENHART   1,913,205
ANTIFOGGING DEVICE
Filed Dec. 27, 1927
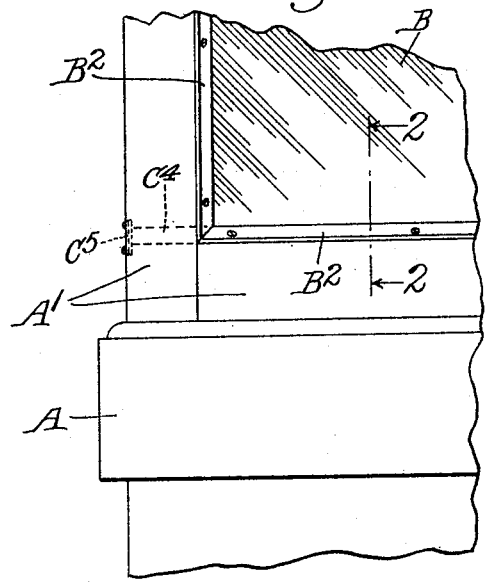
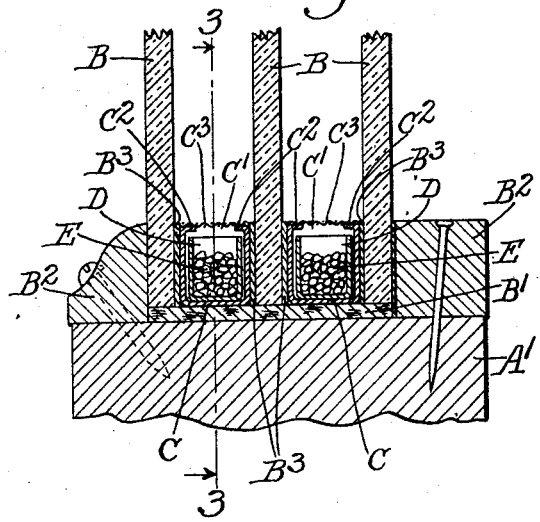
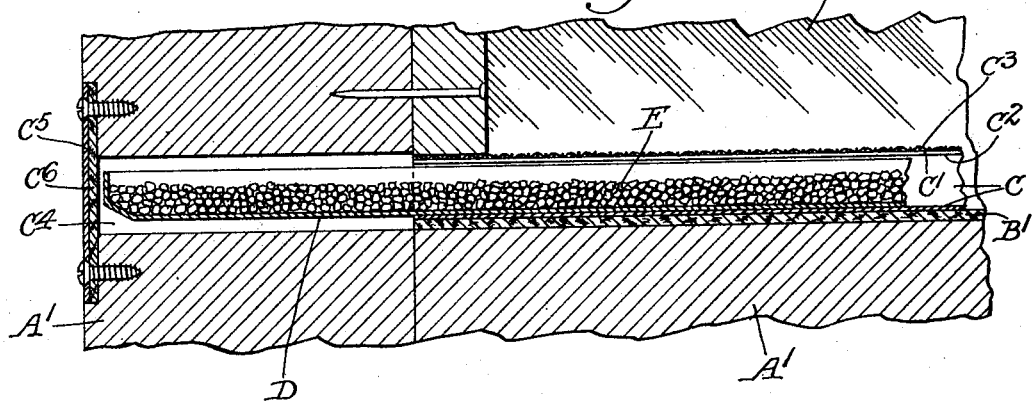
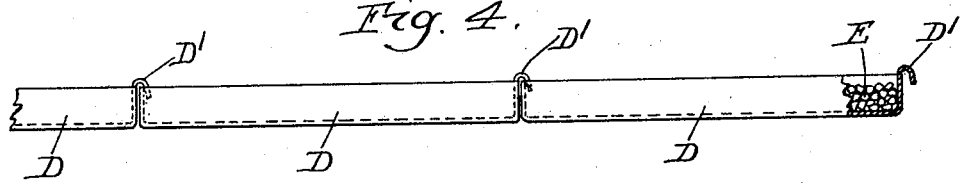
Inventor
William F. Lenhart
by Parker & Carter
Attorneys Patented June 6, 1933

1,913,205

UNITED STATES PATENT OFFICE

WILLIAM F. LENHART, OF MARSHALL, MICHIGAN, ASSIGNOR TO SHERER-GILLETT COMPANY, OF CHICAGO, ILLINOIS, A CORPORATION OF ILLINOIS

ANTIFOGGING DEVICE

Application filed December 27, 1927. Serial No. 242,650.

This invention relates to a show case and specifically to means for preventing the fogging of the glass of a show case. While it is illustrated herewith in connection with a show case, it might equally well be applied as a means for preventing the fogging of any glass where two or more glasses are spaced so as to provide a confined air space between them. One object of the invention is to provide means for removing from the air which is between the glasses such moisture as may have accidentally been entrapped there at the time the glasses were put in position, and also to remove moisture which may have leaked in or otherwise gotten into the space in question. Other objects will appear from time to time in the course of the specification and claims.

I illustrate my invention more or less diagrammatically in the accompanying drawing wherein—

Figure 1 is a fragmentary elevation of a show case;

Figure 2 is a vertical cross section taken on line 2—2 of Figure 1;

Figure 3 is a horizontal, longitudinal cross section taken on line 3—3 of Figure 2;

Figure 4 is a detail elevational view with parts in section and parts broken away showing the method of attaching the containers.

Like parts are indicated by like characters throughout the specification and drawing.

A is a show case. $A^1$, $A^1$ are frame members which support the glass parts.

B, B are pieces of glass which are positioned between the frame members $A^1$. They are insulated on the frame members by means of cork or other suitable insulating material $B^1$ and are held in position generally by strips or members $B^2$. On the inside of each glass is an insulating member $B^3$.

Positioned within the confined space between each pair of glasses is a trough or other container C. In the form here shown the trough is metallic and is provided with an opening $C^1$ in its top and inwardly bent flanges $C^2$. There is preferably fixed across the open top a screen $C^3$. While in its preferred form the member $C^3$ is a screen, any suitable perforated or partially open member might be used. It is sufficient for the purposes of the invention that this member be sufficiently open to permit the passage of air through it into the trough C.

Opposite each of the spaces between the pairs of glass and formed in the adjacent frame member $A^1$ is a perforation or opening $C^4$. This is preferably closed by a removable cover $C^5$ which is provided on its inside with an insulated part $C^6$.

D is a tray. It is provided with an open top and is of such size as to permit insertion and movement along the trough C. Each of the trays D is preferably provided with a downwardly bent hooked end $D^1$. By this means successive trays may be joined to each other so that they can all be moved in unison as though one single long tray were used and yet when being put into or taken out of the show case each separate tray may be separately connected or disconnected and thus only limited space needs be kept available at the end of the show case to permit movement, manipulation, insertion or removal of the trays. Each of the trays is filled with any suitable hygroscopic material E.

The use and operation of my invention are as follows:

The show case is assembled in the form shown with the outer metallic trough fixed in place between each of the pairs of glasses so that each confined spaced which is formed between the glasses is provided in its bottom with such a trough. When the show case has been built a sufficient number of the trays are filled with hygroscopic material and they are then slid into the troughs and the cover at the end of the opening is replaced. Thus there is provided in each of the confined spaces between the glasses a container which is of hygroscopic material and absorbs from the air the moisture which is within it. The moisture will be deposited in the trays which contain the hygroscopic material. At suitable intervals these trays may be withdrawn and fresh hygroscopic material will be inserted and then the trays may then be put back in position. Thus the space between the glasses is kept substantially free from moisture and fogging or clouding of the glasses due to the presence of moisture within them is prevented.

I claim:

1. In combination, a pair of glass members mounted together to form an inclosed space, means for rendering the air between them dry, including a removable containing member, said removable containing member filled with a hygroscopic material, there being an opening from said air tight space and a closure therefor, to permit insertion and removal of a plurality of such removable members into and from said enclosed space, each of such members provided at one end with a part adapted to interlock with an adjacent member.

2. In combination, a pair of glass members mounted together to form an inclosed space, means for rendering the air between them dry, including a permanent containing member having an open top and a removable containing member, said removable containing member located within the permanent member and filled with a hygroscopic material, there being an opening from said air tight space and a closure therefor, to permit insertion and removal of a plurality of such removable members into and from said enclosed space, each of such members provided with a part adapted to interlock with an adjacent member.

3. In combination in a show case, a double glass wall including spaced panes defining a confined air space, said case having an opening to such air space, an open ended trough in the bottom of such confined space, a perforated cover positioned thereon, the opening in the case being alined with the open end of the trough, and one or more removable containers adapted to fit into said trough in such air space and to contain hygroscopic material, said containers being movable into and out of said trough through said case opening in a plane parallel to the planes of said panes.

4. In combination in a show case, a double glass wall including spaced panes defining a confined air space, said case having an opening to such air space, a removable cover therefor, an open ended trough in the bottom of such confined space, a perforated cover positioned thereon, the opening in the case being alined with the open end of the trough, and one or more removable containers adapted to fit into said trough in such air space and to contain hygroscopic material, said containers being movable into and out of said trough through said case opening in a plane parallel to the planes of said panes.

5. In combination in a double wall, a pair of glass members forming said wall and mounted together to form an inclosed and generally air tight space, including a generally elongated portion adapted to receive one or more removable container members, means for rendering the air between the glass members dry, including a removable containing member, said removable containing member filled with a hygroscopic material, there being an opening from said air tight space and a closure therefor, said opening and closure being operatively positioned with respect to the elongated container receiving portion of said space, to permit insertion and removal of a plurality of such removable members into and from said inclosed space, in a generally straight line parallel to the planes of said glass members, said members being provided with interlocking features whereby they may be interconnected for passage through said opening in a longitudinal series.

6. In combination in a double wall, frame members, a pair of glass members forming said wall and mounted in spaced relation in said frame members to form an inclosed space, means for rendering the air between them dry, including an open ended fixed containing member having an open top positioned between said glass members, and a removable open top containing member, said removable open top containing member being filled with a hygroscopic material and insertable within the fixed containing member through the open end thereof, there being an opening through one of said frame members from said inclosed space, alined with the end opening of said fixed container member, and a removable closure therefor, whereby to permit insertion and removal of such removable member into and from said fixed containing member within the inclosed space.

7. In combination in a double wall, a pair of glass members forming said wall and mounted together to form an inclosed space, means for rendering the air between them dry, including a fixed containing member and a removable containing member, said removable containing member located within the fixed member and filled with a hygroscopic material, there being an opening from said air tight space and a closure therefor, said closure and opening being positioned with respect to the fixed containing member so as to permit insertion and removal of a plurality of such removable members into and from said enclosed space, in a straight line generally parallel to the plane of said glass members, said removable containing members being provided with cooperative means for connecting said members in a longitudinal series.

8. In combination in a double wall, a pair of glass members forming said wall and mounted together to form an inclosed space, means for rendering the air between them dry, including a fixed containing member having an open top and a removable containing member, said removable containing member located within the fixed member and filled with a hygroscopic material, there being an opening from said air tight space and a closure therefor, said closure and opening being positioned with respect to the fixed containing member so as to permit insertion and removal of a plurality of such removable members into and from said enclosed space, in a straight line generally parallel to the plane of said glass members, said removable containing members being provided with co-operative means for connecting said members in longitudinal series.

Signed at Marshall county of Calhoun and State of Michigan, this 14th day of December 1927.

WILLIAM F. LENHART.